Oct. 20, 1970

W. F. BUCHELE ET AL  3,534,537
MACHINE FOR FORMING AND HANDLING LARGE
ROUND BALES OF A FIBROUS MATERIAL

Filed June 4, 1968

INVENTORS
WESLEY F. BUCHELE
VIRGIL D. HAVERDINK
BY Rudolph L. Lowell
ATTORNEY

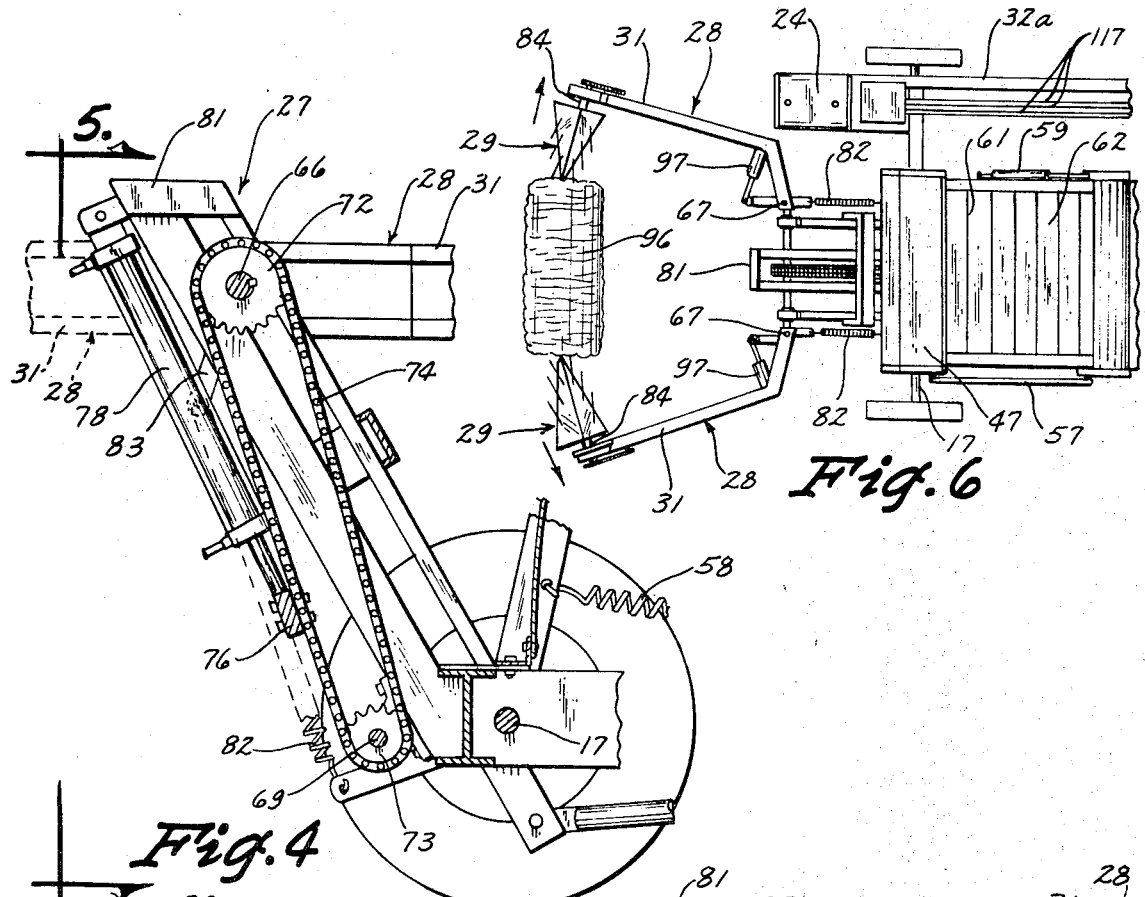
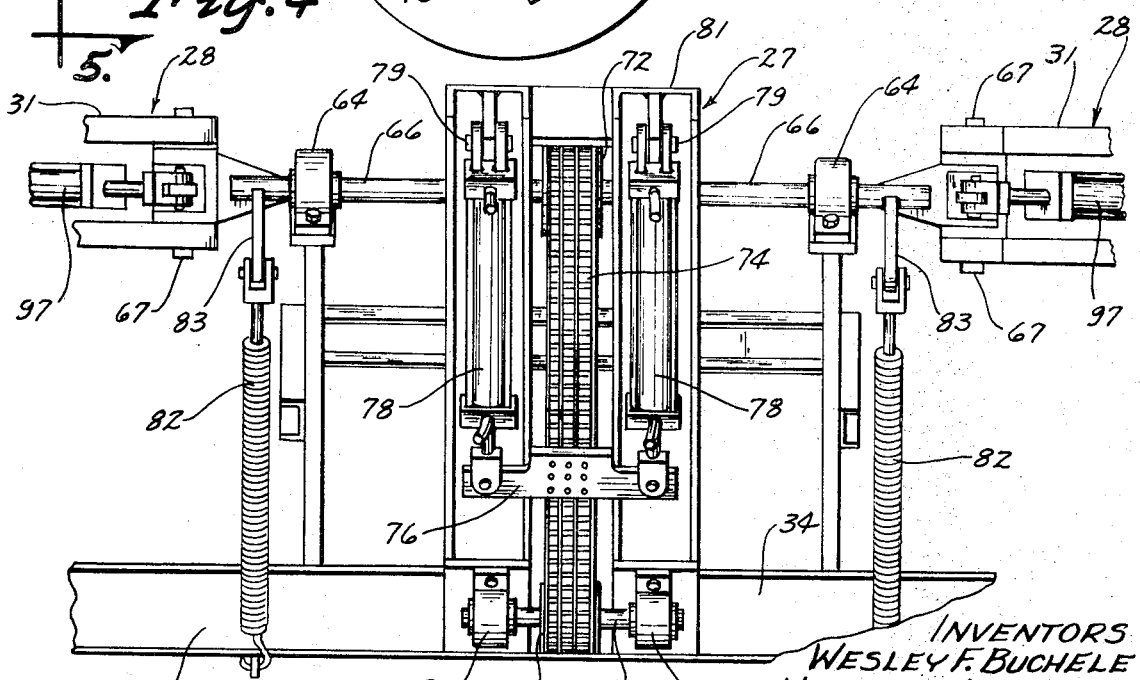

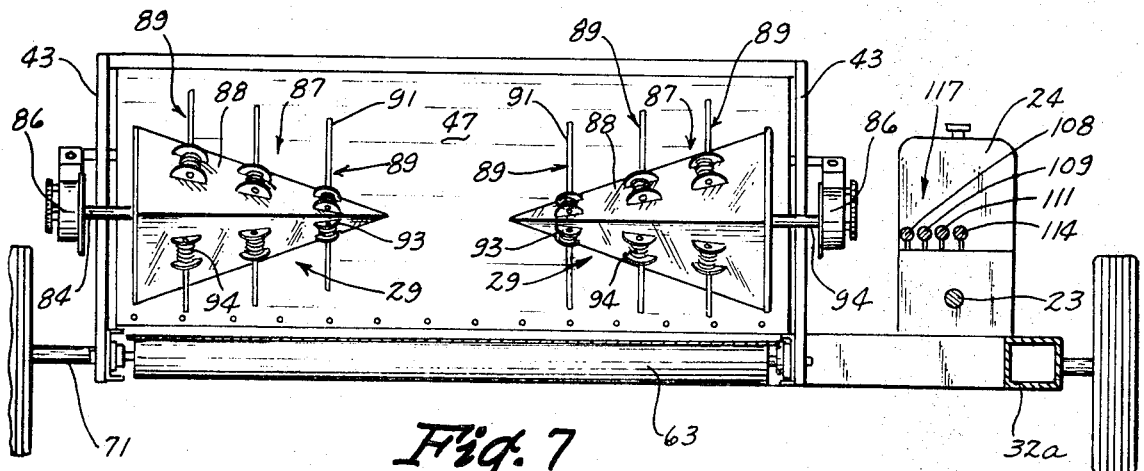
Fig. 7
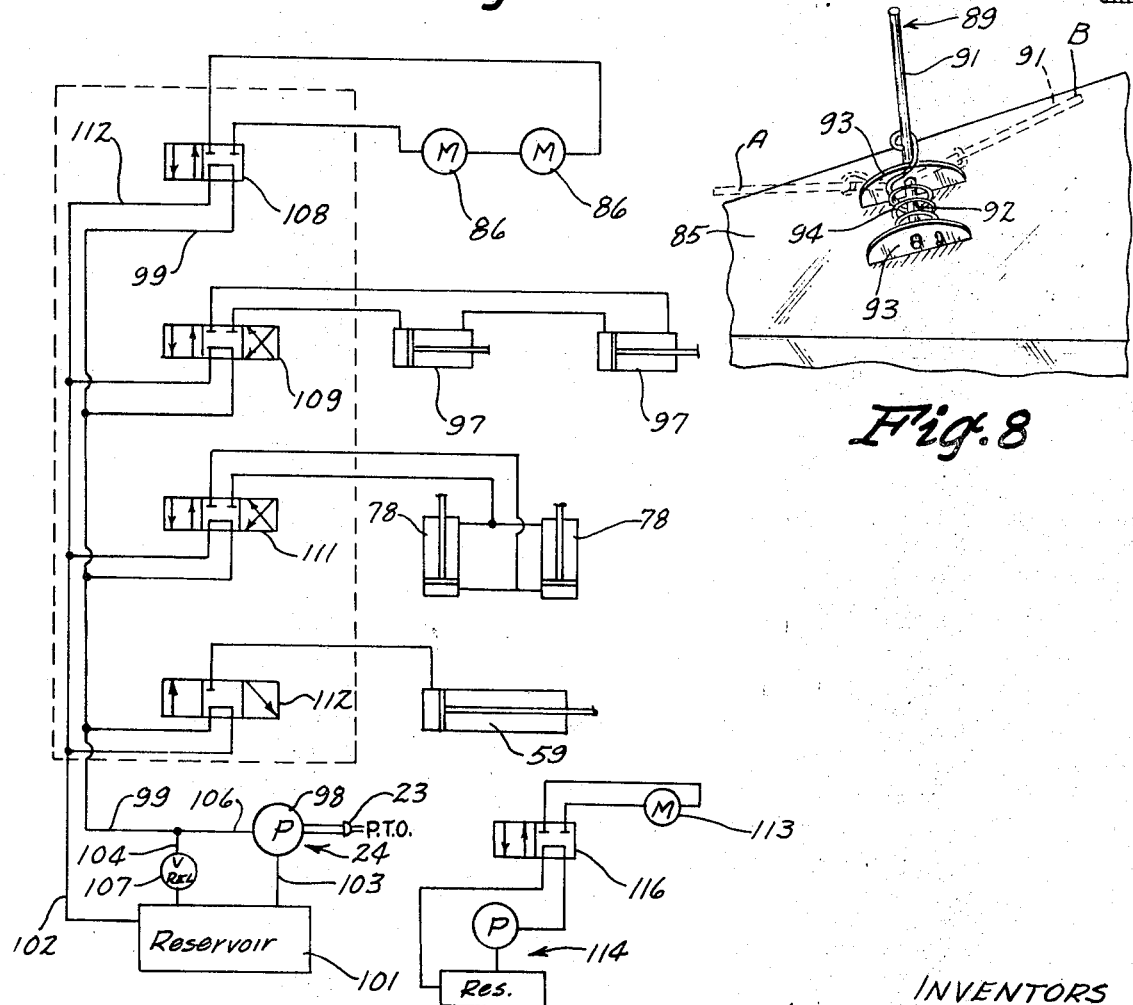
Fig. 9
Fig. 8
INVENTORS
WESLEY F. BUCHELE
VIRGIL D. HAVERDINK
BY
ATTORNEY — # United States Patent Office 3,534,537
Patented Oct. 20, 1970

3,534,537
MACHINE FOR FORMING AND HANDLING LARGE ROUND BALES OF A FIBROUS MATERIAL
Wesley F. Buchele, Ames, and Virgil D. Haverdink, Ankeny, Iowa, assignors to Iowa State University Research Foundation, Inc., Ames, Iowa, a corporation of Iowa
Filed June 4, 1968, Ser. No. 734,316
Int. Cl. *A01d 39/00*
U.S. Cl. 56—341
7 Claims

ABSTRACT OF THE DISCLOSURE

The machine of this invention provides for the forming of large round bales, weighing from a half a ton to a ton, from a windrowed fibrous material such as hay or the like, transporting the bales to a storage position, and releasing the bales at the storage position. A pair of transversely spaced swing arms are supported on a portable frame unit for up and down pivotal movement between bale releasing positions projected rearwardly of the frame unit to forwardly projected bale forming positions, and for pivotal movement toward and away from each other in either the bale forming or bale releasing positions therefor. A rotatable material wrapping and bale supporting spindle is carried at the free end of each arm so that when the arms are in their bale forming positions, the spindles project inwardly toward each other from the opposite ends of a bale forming compartment that extends transversely of the frame unit. With the swing arms in their bale forming positions and on a forward advance of the frame unit along a windrow, the windrowed material is picked up and directed into the bale forming compartment where it is engaged by the spindles for wrapping thereon. As the material is wrapped it is yieldably confined about the spindles to give satisfactory compactness or density to the completed bale. When the bale is completed and while in the bale forming compartment it may be transported to a storage position. At the storage position and while the bale is supported on the spindles, the swing arms are pivotally movable to their bale releasing positions, in which they are then pivotally moved away from each other to release the formed bale from the spindles.

SUMMARY OF THE INVENTION

The machine of this invention provides for the forming of large round compact bales from a windrowed fibrous material such as hay, alfalfa and the like, in a simple and efficient manner by the pivotal support of the swing arm-spindle units for pivotal movement in vertical planes between a bale forming position and a bale releasing position and for pivotal movement toward and away from each other in either of such positions. In the bale forming position of the swing arms the spindles are located at and project inwardly from the opposite ends of a bale forming compartment that has an open top side. The windrowed material is picked up from the ground surface, as the machine is advanced, and directed into the bale forming compartment where it is engaged by the rotatable spindles and wrapped about itself to form a bale. The formed bale is readily transportable to a storage position, while being carried on the spindles in a supported position on the bottom side of the bale forming compartment of the machine, and then easily released at the storage position by merely pivoting the swing arms to their bale releasing positions wherein the spindles are located rearwardly of the machine. During this pivotal movement of the swing arms the formed bale is supported alone on the spindles, which extend into the opposite ends of the bale and are readily released from the bale at the storage position, by simply moving the swing arms away from each other. By reversing the bale releasing operation, the bale may be picked up by the swing arm-spindle units from the storage position for transport to a feeding station, where it is again released.

DETAILED DESCRIPTION OF THE INVENTION

Further objects features and advantages of the invention will become apparent from the following description when taken in connection with the accompanying drawings in which:

FIG. 4 is an enlarged sectional view as seen on the line 4—4 of FIG. 1, showing a support frame for a pair of swing arm-spindle units that form part of the machine;

FIG. 5 is a rear elevational view of the support frame and swing arm-spindle unit assembly taken along the line 5—5 in FIG. 4;

FIG. 6 is a reduced foreshortened plan view of the machine showing the parts thereof in a bale releasing operation;

FIG. 7 is an enlarged sectional view taken on the line 7—7 in FIG. 1;

FIG. 8 is a detail perspective view of a gripping finger that forms part of a spindle assembly; and FIG. 9 is a diagrammatic showing of the hydraulic control system for the machine.

Figure 1:
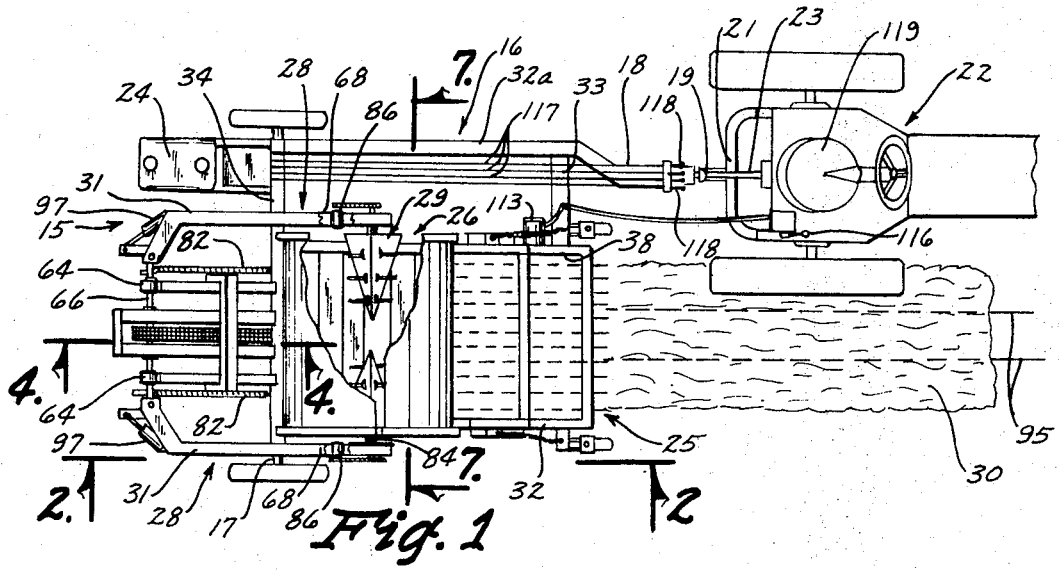
FIG. 1 is a plan view of the bale forming and releasing machine of this invention with parts broken away to more clearly show its construction.
Figure 2:
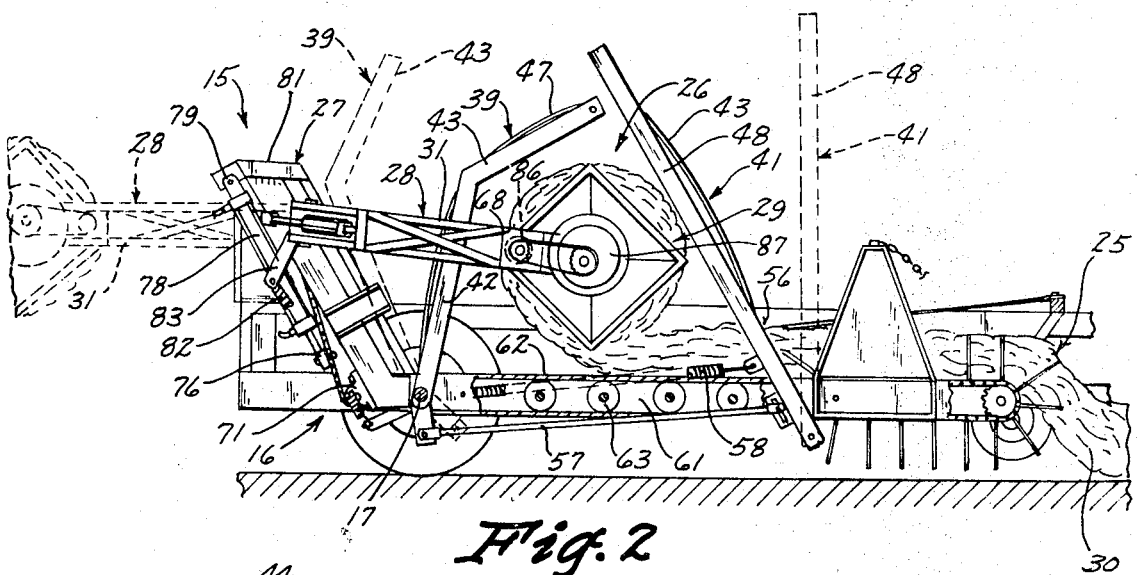
FIG. 2 is an enlarged sectional view taken along the line 2—2 in FIG. 1 showing the arrangement of the machine parts in a bale forming operation.

With reference to FIGS. 1 and 2 of the drawings, the machine of this invention, indicated generally at 15, is seen to include a portable frame 16 having a rear end wheel and axle assembly 17. A side carried tongue 18 on the frame 16 is coupled at 19, in a usual manner, to the draw bar 21 of a tractor 22 so that the front end of the portable frame 16 is arranged to one side of and rearwardly of the tractor. The tractor is equipped with the usual power take-off 23 that is in a drive relation with a pump unit 24 mounted on the machine frame 16 for supplying oil under pressure to the hydraulic control system of the machine.

The machine 15 includes a baling compartment 26 located rearwardly on the frame 16, a forwardly located pick up device 25 for gathering a windrowed material indicated at 30, and an upright frame 27 positioned rearwardly of the baling compartment 26 for supporting a pair of transversely spaced swing arm-spindle units 28. As the machine 15 is advanced by the tractor 22 the windrowed material 30 is gathered by the pick up device 25 and carried in to the baling compartment 26 where it is engaged by and wrapped around rotatable spindle assemblies 29 that form part of the units 28. A completed bale is lifted by the swing arms 31 of the units 28 in a supported position on the spindle assemblies 29 for movement by the swing arms to a position rearwardly of the frame 16 where it is released for storage or feeding purposes.

The frame 16 (FIG. 1) is of a generally rectangular shape having side members 32 and 32a, a front end member 33 and a rear end member 34 positioned between the side members 32 and 32a. An intermediate longitudinal frame member 38 extends between and is connected to the frame end members 33 and 34.

The baling compartment 26 extends transversely of the machine 15 in a supported position on the frame members 32 and 38. The compartment 26 (FIGS. 2 and 3) includes a rear wall member 39 and a front wall member 41. The rear wall member (FIG. 3) is comprised of a pair of upright transversely spaced pivoted arm members 42 having forwardly and upwardly inclined upper sections 43 connected together by a brace bar 44. The lower ends of the arm members 42 are pivoted on a shaft 46 carried on the frame members 32 and 38. A flexible panel 47 of a metal construction extended between the arm members 42 has its upper end secured to the brace bar 44 and its lower end secured to the rear frame member 34.

Figure 3:
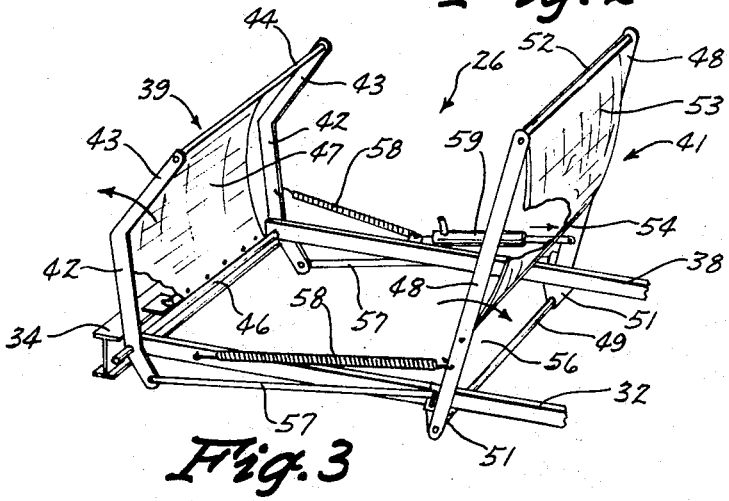
FIG. 3 is a detail perspective view, with some parts broken away, showing the assembly of the front and rear wall members of a bale forming compartment.

The front wall 41 (FIG. 3) includes a pair of upright transversely spaced pivoted arm members 48 that have their lower ends mounted on a shaft 49 carried in supports 51 which are mounted in a depending relation from the frame members 32 and 38. The upper ends of the arm members 48 are connected together by a brace member 52 with a flexible panel 53 extended between the arm members having its top end secured to the bar 52 and its lower end to a transverse bar 54. As best shown in FIG. 3 the bar 54 is connected between the arm members 48 at a position above the frame members 32 and 38 so as to form a transversely extended opening 56 in the front wall 41. Corresponding arm members 42 and 48 of the front and rear walls 39 and 41, respectively, are pivotally interconnected by link members 57, with the forward end of a link 57 connected to an arm 48 at a position above its pivotal support 51, and with a rear end of a link 57 connected to an arm 42 below its pivotal support 46.

The upper ends of the wall members 39 and 41 are biased toward each other by a pair of coil springs 58 to inner positions shown in FIG. 2, and are movable to positions away from each other, shown in FIG. 3, by a hydraulic cylinder assembly 59. This cylinder has one end connected to the frame member 38 and its opposite end connected to an adjacent arm member 48 of the front wall 41.

It is seen therefore that when the upper ends of the wall members 39 and 41 of the baling compartment 26 are in their inner positions of FIG. 2 that the top side of the compartment is substantially closed. When the wall members 41 and 39 are moved apart from each other by the cylinder assembly 59, to their positions shown in FIG. 3, the top side of the compartment 26 is completely open.

A bottom wall 61 (FIGS. 2 and 6) for the baling compartment 26 is comprised of an endless conveyor 62 extended longitudinally between the frame members 32 and 38 and has a rearwardly moving top length located substantially at the level of the top sides of the frame members 32 and 38. The top length of the conveyor 62 is supported on transversely extended rollers 63 that are rotatably carried between and on the frame members 32 and 38.

The frame structure 27 is mounted on the rear frame member 34 and extends upwardly and rearwardly of the baling compartment 26 (FIGS. 2 and 4). The frame 27 carries a pair of transversely spaced bearing units 64 (FIG. 5) for rotatably supporting a transverse rock shaft 66. The swing arms 31 are pivotally mounted at the opposite ends of the rock shaft 66 on pivots 67 for pivotal movement about parallel axes that extend transversely of the rock shaft. The swing arms 31 are thus rotatable as a unit with the rock shaft 66 and are pivotally movable about their pivots 67 relative to the rock shaft which is carried on the frame 27 at a height intermediate the lower and upper ends of the baling compartment 26.

The swing arms 31 (FIGS. 1 and 2) in one rotated position are arranged along sides of the frame members 32 and 38 and project forwardly of the rock shaft 66 with their free ends 68 located at opposite ends of the baling compartment 26. This rotated position of the swing arms 28 will hereinafter be referred to as their bale position. In a second position, rotated upwardly and rearwardly from their bale forming positions, the swing arms 28 are located in bale releasing positions, shown in dotted lines in FIG. 2, projected rearwardly from the rock shaft 66.

Rotation or rocking movement of the shaft 66 to in turn rotate the swing arms 31 is accomplished by means including a jack shaft 69 mounted in bearings 71 on the rear frame member 34 so as to be centrally located between the frame members 32 and 38 in a parallel relation with the rock shaft 66. Sprocket gears 72 and 73 (FIGS. 4 and 5) on the shafts 66 and 69, respectively, are interconnected by a sprocket chain 74. A cross head 76 is secured to the outer surface of the rear length of the chain 74. A pair of double acting hydraulic cylinder assemblies 78 are arranged rearwardly of and to opposite sides of the chain 74 for connection at one of their ends to the cross head 76. The opposite ends of the cylinder assemblies 78 are pivotally supported at 79 from the upper end 81 of the upright frame 27.

When the cylinder assemblies 78 are in retracted positions, as shown in FIGS. 4 and 5, the swing arms 31 are in their bale forming positions projected horizontally and forwardly from the rock shaft 66. On extension of the cylinder assemblies 78 the rock shaft 66 is rotated in a counter clockwise direction, as viewed in FIG. 4, to rotate the swing arms 31 upwardly and rearwardly from their bale forming positions, shown in FIGS. 2 and 4, to their bale releasing positions, shown in FIG. 6 and in dotted lines of FIG. 2, wherein they are projected rearwardly from the rock shaft 66.

It will be noted that the downward movement of the swing arms 31 to a bale releasing position, due to the weight of the bale supported thereon, will tend to increase the rate of extension of the cylinder assemblies 78. To minimize the occurrence of a shock force being applied to the cylinder assemblies 78 as they reach their extended positions, the weight of the bale is counteracted by a pair of upright coil springs 82 (FIGS. 4 and 5) arranged to opposite sides of the frame 27 and connected at their lower ends to the rear frame member 34 of the portable frame 16. The upper ends of the springs 82 are attached to the free ends of rock arms 83 that extend radially downwardly from the rock shaft 66, when the swing arms 31 are in bale forming positions.

On rotation of the shaft 66 therefor to move the swing arms 31 from bale forming positions to their bale releasing positions the tension force of the springs 82, counteracting such rotation of the shaft 66, is progressively increased to a maximum force wherein the rock arms 83 are projected upwardly from the rock shaft when the swing arms 31 are in bale releasing positions.

As shown in FIGS. 6 and 7 each spindle assembly 29 is rotatably mounted at the free end of a corresponding swing arm 31 of a unit 28, so that the spindle assemblies are projected laterally of the arms 31 toward each other. Since each spindle assembly 29 is similar in construction and operation, only one of the spindle assemblies 29 will be described in detail, with like numbers being applied to like parts.

A spindle assembly 29 includes a shaft 84 rotatably supported on and extended transversely of a swing arm 31 in a driven relation with an oil motor 86 that is also mounted on the swing arm. The shaft 84 carries a housing 87 of a pyramid shape having the apex thereof at the innermost end of the spindle shaft 84. Each side section 88 of the housing 87 carries a plurality of axially spaced material gripping fingers 89 that have elongated sections 91 normally extended in a direction radially from the spindle shaft 84.

Referring to FIG. 8 it is seen that each finger 89 is comprised of a rod member of an L-shape having a short leg section 92 rotatably mounted on and extended between a pair of ears 93 spaced transversely of a housing side section 88. A torsion spring 94 mounted about the short leg section 92 acts to yieldably hold the long leg section 91 of a finger member 89 in its radially projected position. The leg section 91 is thus yieldably movable in opposite directions relative to the radially projected positions therefor through substantially an angle of one hundred eighty degrees for a purpose to appear later.

In the use of the machine 15 of this invention let it be assumed that the swing arms 31 are in their bale forming positions shown in FIG. 2, with the walls 39 and 41 of the baling compartment 26 pivotally moved to their inner positions so as to close the top side of the compartment 26. The spindle assemblies 29 (FIG. 1) are thus extended inwardly of the compartment 26 from the opposite ends thereof.

The spindle assemblies 29 are then rotated in a clockwise direction as viewed in FIG. 2, concurrently with the operation of the conveyor 61 to move its top length 62 in a rearward direction. With the pick up device 25 in operation, and on a forward advance of the tractor 22, the windrowed fibrous material 30 (FIG. 2) is gathered by the pick up device and moved thereby into the baling compartment 26 through the material inlet 56 formed in the front compartment wall 41. The material on entering the baling compartment 26 is moved rearwardly by the conveyor 62 between the spindle assemblies 29 where it is picked up by the finger members 89 for wrapping about the spindle assemblies to form a bale.

As the material is wrapped about the spindles 29 it is yieldably compressed about the spindles by the compartment walls 39 and 41 through the action of the springs 58 (FIG. 3). This compressing action takes place concurrently with the function of the conveyor 62 to eliminate the accumulation of the material forwardly of the spindles concurrently with reducing the bale being formed having its lower side in a dragging relation with the compartment bottom wall 61, as would occur to an appreciable extent if such bottom wall was stationary. By thus reducing frictional resistance between the bottom wall 61 and the bottom portion of the bale being formed the tendency of the wrapped fibrous material being rotated relative to the incoming material that is to be wrapped is substantially eliminated.

By virtue of the cooperative bale compressing action of the compartment side walls 39 and 41 and the movement of the bottom wall 61 there is provided a round bale of a relative large size having satisfactory characteristics as to compactness and density. The formed bale may be of a size of five feet in diameter having a length of about seven and a half feet and weighing about a half ton.

Where the windrowed fibrous material 30 is of a short length so as to reduce what may be referred to as its woven or matted pattern, such material has a tendency to break or become separated. Twine or the like, indicated at 95 in FIG. 1, may initially be laid out below the windrow. The twine functions to hold the windrowed material 30 against separation and is moved with the windrowed material 30 into the baling compartment 26 for wrapping into the bale being formed.

On completion of the baling operation, the operation of the machine 15 is discontinued, so that with the completed bale 96 in a supported position on the spindle assemblies 29 and on the conveyor 62, the machine 15 may be used as a bale transport for moving the bale to a desired storage or feeding position.

To remove the bale from the machine 15 the hydraulic cylinder 59 is initially actuated to move the compartment walls 39 and 41 away from each other to their positions in FIG. 3 so as to completely open the top side of the baling compartment 26. The rock shaft 66 is then rotated, by actuation of the hydraulic cylinder assemblies 78, to move the swing arms 31 upwardly and rearwardly from their full line positions in FIG. 2 to their dotted line bale releasing positions shown in the same figure. With the arms 31 in bale releasing positions the spindle assemblies 29, as shown in FIG. 6, are moved outwardly from the opposite ends of the bale 96.

During this movement of the spindle assemblies the gripping fingers 89 are folded inwardly, to their dotted line positions indicated at A in FIG. 8, against the action of the springs 94 and in a direction toward the apex end of the spindle housing 88. This folding takes place as a result of the withdrawal action of the spindle assemblies relative to the bale so as to release the fingers from gripping engagement with the bale 96. The outward movement of the spindle assemblies 29 to release the bale 96 is accomplished by the outward pivotal movement of the swing arms 31 about their pivots 67. Each of a pair of hydraulic cylinder assemblies 97, corresponding to the arms 31, has one end pivotally connected to a swing arm 31 and at its opposite end to the rock shaft 66.

With the bale 96 released the swing arms 31 are moved inwardly by the cylinder assemblies 97, and with the compartment side walls 39 and 41 held in their open positions by the hydraulic cylinder 59 the swing arms 31 are returned to their bale forming positions by actuation of the rock shaft 66. On closing of the compartment side walls 39 and 41 the machine is ready for another baling operation.

If it is desired to move a stored bale 96 to another location the machine 15 is manipulated relative to the stored bale so that with the swing arms 31 in their bale releasing positions, and spread apart from each other, as illustrated in FIG. 6, the spindle assemblies 29 are insertable within the ends of the bale 96 on bringing the swing arms 31 together. During this insertion of the spindle assemblies 29 the gripping fingers 89 are moved in directions away from the apex end of the spindle housing 88 to their dotted line positions B shown in FIG. 8. The bale may then be transported in a supported position on the arms 31, while the arms are in bale releasing positions therefor, or it may be moved by the arms 28 into a supported position within the baling compartment 26.

The hydraulic control system for the machine 15, as shown in FIG. 9, includes the pump unit 24 having a pump 98 driven from the power take off 23. The pump supplies fluid under pressure to a main line 99, with the fluid being returned to a reservoir 101 of the unit 24 through a return line 102. An intake line 103 for the pump 98 is connected to the reservoir and a by-pass line 104 is provided between the pump outlet 106 and the reservoir. The flow of fluid through the by-pass line is controlled by a pressure relief valve 107.

The oil motors 86 for rotating the spindle assemblies 29 are in series connection with the supply line 99 and are actuated by a two position control valve 108. The cylinder assemblies 97 for pivotally moving the swing arms 31 relative to the rock shaft 66 are series connected. The cylinder assemblies 97 are of a double acting type and actuated by a three position control valve 109. The cylinder assemblies 78 for rotating the rock shaft 66 are of double acting type and connected in parallel for operation in response to a manual through position control valve 111. The cylinder assembly 57 for moving the baling compartment walls 39 and 41 to their open positions is of single acting type and is interconnected with the supply line 99 and return line 102 by a through position manual control valve 112. An oil motor 113 connected directly to a tractor pump unit 114 operates the pick up device 25 and the conveyor 62, and is controlled by a two position valve 116.

All of the control valves 108, 109, 111 and 112 are located adjacent the pump unit 24 and are connected through links 117 (FIGS. 1 and 7) extended longitudinally above the frame member 32a to corresponding manually operated levers 118 located adjacent the tractor seat 119 so as to be conveniently accessible to the tractor operator. The control valve 116 may be carried directly on the tractor 22.

Although the invention has been described with respect to a preferred embodiment thereof, it is to be understood that it is not to be so limited since changes can be made therein which are within the full intended scope of this invention as defined by the appended claims.

We claim:

1. A machine for forming and releasing round bales of a windrowed fibrous material comprising:
   (a) a portable frame unit,
   (b) a bale forming compartment extended transversely of said frame unit,
   (c) a pair of transversely spaced horizontally positioned rotatable material engaging spindles,
   (d) means movably supporting said spindles on said frame unit for movement longitudinally of the frame unit from first positions spaced rearwardly of said frame unit to second positions located within opposite ends of said compartment, and for movement transversely of the frame unit toward and away from each other, and
   (e) means on said frame unit, when said spindles are in said second positions and said portable frame unit is advanced along a windrow, for picking up and directing windrowed material into said baling compartment for engagement and wrapping by said spindles to form a bale,
   (f) said spindles, when a bale has been formed therebetween, being movable to the first positions therefor and in said first positions being transversely movable away from each other to release the formed bale.

2. A machine for forming and releasing round bales of a windrowed fibrous material comprising:
   (a) a portable frame unit,
   (b) an upright frame extended transversely of said frame unit adjacent the rear end thereof,
   (c) a transversely extended rock shaft rotatably supported on said upright frame,
   (d) a pair of swing arms,
   (e) means pivotally supporting each swing arm adjacent an end of said rock shaft for pivotal movement relative to the rock shaft to first positions extended normal to the axis of rotation of said rock shaft, and to second positions inclined outwardly from the ends of the rock shaft, said swing arms being rotatable with said rock shaft between positions projected forwardly and rearwardly from said rock shaft,
   (f) a pair of rotatable material engaging spindles corresponding to said swing arms and projected toward each other,
   (g) means rotatably supporting a spindle at the free end of a corresponding swing arm for rotation about an axis extended laterally of a swing arm,
   (h) means for yieldably confining the material about said spindles when the swing arms are projected forwardly from the rock shaft in the first positions therefor; and
   (i) means, when said portable frame unit is advanced along a windrow, for picking up and directing material to said spindles for engagement and wrapping thereby,
   (j) said rock shaft, on forming of a bale of material on said spindles, being rocked to move the swing arms to positions projected rearwardly from the rock shaft, after which the swing arms are pivotally moved from the first positions to the second positions therefor to release the formed bale from said spindles.

3. A machine for forming and releasing round bales of a windrowed fibrous material comprising:
   (a) a portable frame unit,
   (b) an upright frame structure adjacent the rear end of said frame unit,
   (c) a pair of transversely spaced swing arms,
   (d) means rotatably supporting said swing arms on said frame structure for rotational movement from first bale forming positions extended forwardly from said frame structure to second bale releasing positions extended rearwardly from said frame structure,
   (e) means on said rotatable means providing for the pivotal movement of said swing arms toward and away from each other to inner and outer positions therefor,
   (f) a pair of rotatable material engaging spindles corresponding to said swing arms,
   (g) means rotatably supporting each spindle adjacent the free end of a corresponding swing arm so that the spindles extend inwardly toward each other,
   (h) means, when the swing arms are in said inner and first positions therefor and said portable unit is advanced, for picking up and directing the windrowed material toward said spindles for engagement and wrapping thereby, and
   (i) means for yieldably confining the directed material about said spindles to form a bale of the material thereon,
   (j) said swing arms, when a bale has been formed, being movable from said first positions to the second positions therefor, and then pivotally moved away from each other to the outer positions therefor to release the formed bale from said spindles.

4. A machine for forming and releasing round bales of a windrowed fibrous material comprising:
   (a) a portable frame unit,
   (b) a transversely extended baling compartment on said frame unit having a front wall with a material receiving inlet therein,
   (c) a transversely extended rock shaft located rearwardly of said baling compartment,
   (d) means on said frame unit rotatably supporting said rock shaft at a position intermediate the upper and lower ends of said baling compartment,
   (e) a pair of swing arms,
   (f) means pivotally supporting the swing arms at opposite ends of the rock shaft for rotational movement therewith to first bale forming positions projected forwardly from said rock shaft and to second bale releasing positions projected rearwardly from the rock shaft, and for pivotal movement relative to said rock shaft about parallel axes extended transversely of the rock shaft,
   (g) a pair of rotatable power driven spindles corresponding to said swing arms,
   (h) means rotatably supporting the spindles on said swing arms adjacent the free ends thereof so as to project inwardly toward each other,
   (i) said swing arms, in the first positions therefor, providing for said spindles being extended inwardly of said baling compartment from the opposite ends thereof,
   (j) means on said frame unit, when the frame unit is advanced along a windrow, for picking up and directing the windrowed material through said inlet into the baling compartment for engagement and wrapping by said spindles,
   (k) said swing arms, on completion of a bale, being rotated from the first positions to the second positions therefor with the bale supported on said spindles, and
   (l) power means interconnecting said rock shaft and swing arms for pivotally moving said swing arms away from each other in the second positions therefor to release the bale from said spindles.

5. The machine for forming and releasing round bales of a windrowed fibrous material according to claim 4 wherein:
   (a) said baling compartment includes a rear wall and a bottom wall,
   (b) each of said front and rear walls being curved vertically with the concave surfaces thereof in a facing relation,
   (c) means movably supporting said two walls on said frame unit for movement of the upper ends thereof toward and away from each other, (d) means for biasing the upper ends of said front and rear walls toward each other, and (e) power means on said frame unit interconnected with said front and rear walls to move the upper ends thereof away from each other.

6. The machine for forming and releasing round bales of a windrowed fibrous material according to claim 5 wherein:

(a) said bottom wall comprises an endless conveyor having an upper length extended between said front and rear walls movable longitudinally of said frame unit toward said rear wall.

7. The machine for forming and releasing round bales of windrowed fibrous material according to claim 4, including:

(a) a plurality of material gripping fingers normally projected radially from said spindles, (b) means pivotally supporting said fingers on said spindles for reverse pivotal movement in planes extended axially of said spindles to positions extended axially in opposite directions from said radially projected positions, and (c) means yieldably biasing said fingers to the radially projected positions therefor.

References Cited

UNITED STATES PATENTS

| | | | |
|---|---|---|---|
| 254,758 | 3/1882 | Wright | 56—343 |
| 2,581,542 | 1/1952 | Kolzing | 56—341 |
| 2,597,962 | 5/1952 | Whitley | 56—23 X |
| 2,817,944 | 12/1957 | Callum | 100—76 X |

FOREIGN PATENTS

| | | |
|---|---|---|
| 743,962 | 1/1933 | France. |

LOUIS G. MANCENE, Primary Examiner

J. N. ESKOVITZ, Assistant Examiner

U.S. Cl. X.R.

100—76